US012625468B2

(12) United States Patent
Christan

(10) Patent No.: US 12,625,468 B2
(45) Date of Patent: May 12, 2026

(54) HOROLOGICAL ASSEMBLY COMPRISING A BALANCE SPRING AND A STUD

(71) Applicant: ETA SA MANUFACTURE HORLOGÈRE SUISSE, Grenchen (CH)

(72) Inventor: Julien Christan, Bienne (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 292 days.

(21) Appl. No.: 18/481,631

(22) Filed: Oct. 5, 2023

(65) Prior Publication Data

US 2024/0168438 A1 May 23, 2024

(30) Foreign Application Priority Data

Nov. 21, 2022 (EP) .................................... 22208644

(51) Int. Cl.
*G04B 17/34* (2006.01)
*G04B 17/06* (2006.01)

(52) U.S. Cl.
CPC ........... *G04B 17/34* (2013.01); *G04B 17/063* (2013.01)

(58) Field of Classification Search
CPC .... G04B 17/34; G04B 17/063; G04B 17/325; G04B 17/06; G04B 17/32; G04B 17/066
See application file for complete search history.

(56) References Cited

U.S. PATENT DOCUMENTS

| | | | | |
|---|---|---|---|---|
| 3,122,880 A | 3/1964 | Greiner | | |
| 3,262,261 A * | 7/1966 | Monnin | ............... | G04B 17/325 368/178 |
| 3,630,017 A * | 12/1971 | Marti | .................. | G04B 17/325 368/176 |
| 8,297,833 B2 * | 10/2012 | Schmiedchen | ...... | G04B 18/023 368/170 |
| 11,249,440 B2 | 2/2022 | Bucaille | | |

(Continued)

FOREIGN PATENT DOCUMENTS

| | | |
|---|---|---|
| CH | 42750 A | 3/1909 |
| CH | 50092 A | 4/1911 |

(Continued)

OTHER PUBLICATIONS

CH-711380-A2 Machine Translation from PE2E Search (Year: 2017).*
European Search Report for EP 22 20 8644 dated Apr. 19, 2023.

*Primary Examiner* — Edwin A. Leon
*Assistant Examiner* — Kevin Andrew Johnston
(74) *Attorney, Agent, or Firm* — Sughrue Mion, PLLC

(57) ABSTRACT

An assembly (1) for attaching a free end (8) of an outer last coil (10) of a balance spring (12) for a horological movement, this attachment assembly (1) including a stud (2) and a blocking element (14), the stud (2) being provided with a groove (6) in which the free end (8) of the outer last coil (10) of the balance spring (12) is engaged, the blocking element (14) also being engaged in the groove (6), in contact with the outer last coil (10) of the balance spring (12), the attachment assembly (1) further including a clamping member (16) which presses the blocking element (14) against the free end (8) of the outer last coil (10) of the balance spring (12), such that the free end (8) of the outer last coil (10) of the balance spring (12) is immobilised in the groove (6) of the stud (2).

16 Claims, 6 Drawing Sheets

(56) References Cited

U.S. PATENT DOCUMENTS

| | | | | |
|---|---|---|---|---|
| 2006/0072376 | A1 | 4/2006 | Gabus et al. | |
| 2016/0147196 | A1* | 5/2016 | Villard | G04B 15/06 368/127 |

FOREIGN PATENT DOCUMENTS

| | | | | | |
|---|---|---|---|---|---|
| CH | 259873 | A | * | 2/1949 | G04B 17/325 |
| CH | 701 688 | A2 | | 2/2011 | |
| CH | 711380 | A2 | * | 1/2017 | G04B 17/325 |
| EP | 1780611 | A2 | * | 5/2007 | G04B 17/066 |
| FR | 2995098 | A3 | * | 3/2014 | G04D 3/0089 |
| JP | 2011-47941 | A | | 3/2011 | |
| KR | 10-2018-0127367 | A | | 11/2018 | |
| WO | WO-2017067955 | A1 | * | 4/2017 | G04B 17/066 |

* cited by examiner

HOROLOGICAL ASSEMBLY COMPRISING A BALANCE SPRING AND A STUD

CROSS REFERENCE TO RELATED APPLICATIONS

This application claims priority to European Patent Application No. 22208644.9 filed Nov. 21, 2022.

TECHNICAL FIELD OF THE INVENTION

The present invention relates to a balance spring for a balance of a horological movement. The present invention further relates to a stud for attaching an outer last coil of such a balance spring. The invention further relates to a method for manufacturing such a balance spring.

TECHNOLOGICAL BACKGROUND

In the horological field, a balance spring, associated with a balance, forms a regulating member commonly referred to as a sprung balance for mechanical timepieces. The balance spring is initially viewed as a very thin spring that is wound about itself in concentric coils when no stress is exerted thereon. In the mounted state, a first end of the balance spring, referred to as the inner first coil, is attached to a collet fitted on a staff of the balance, and a second end of the balance spring, referred to as the outer last coil, is attached to a stud which is a part typically attached by means of a stud holder in a bridge for the balance, also referred to as a balance cock.

More specifically, the time base for mechanical timepieces, also referred to as the oscillating system, comprises a sprung balance pair and an escapement. The balance consists of a balance staff pivoted between a first and a second bearing and connected to a balance rim by means of radial arms. The balance spring is attached, by its inner first coil, to the staff of the balance, for example by means of a collet, and is attached, by its outer last coil, to a fixed attachment point such as a stud carried by a stud holder.

The escapement, in a very widespread embodiment thereof, comprises a double roller system consisting of a table-roller carrying an impulse pin and a safety-roller in which a notch is made. The escapement further comprises a pallet-lever with a pallet-staff pivoted between a first and a second bearing. The pallet-lever consists of a lever that connects a fork to an entry arm and to an exit arm. The fork consists of an entry horn and of an exit horn, and carries a dart. The travel of the fork is limited by an entry banking pin and an exit banking pin, which can be made in one piece with a pallet-bridge. The entry arm and the exit arm carry an entry pallet and an exit pallet respectively. Finally, the pallet-lever cooperates with an escape wheel set comprising an escape wheel and an escape pinion, this assembly formed by the escape wheel and pinion being pivoted between a first and a second bearing.

A balance spring is a spring which adopts the shape of a spiral when at rest. Wound in a horizontal plane, parallel to the plane of the horological movement, the balance spring serves only one purpose: to make the balance oscillate about its position of equilibrium, also referred to as the dead centre, at as constant a frequency as possible. When the balance leaves its position of equilibrium by pivoting in a given direction, the balance spring contracts. This creates a restoring torque in the balance spring that causes the balance to return to its position of equilibrium. During this beat, the balance spring expands. However, as the balance has acquired a certain speed, and thus kinetic energy, it exceeds its position of equilibrium in the opposite direction to the previous until the restoring torque exerted by the balance spring on the balance stops it again and forces it to turn in the other direction.

The balance spring thus alternately expands and contracts: it is said to breathe. However, many factors can play a part in preventing a balance spring from developing isochronously during the expansion and contraction phases. In particular, the balance spring must withstand oxidation and magnetism, which cause the coils to stick together and work to disrupt the precision of the watch, or even stop it entirely. The influence of atmospheric pressure, on the other hand, is low. For a long time, temperature has been the main problem, because heat expands the metal, while cold shrinks it. The balance spring must thus be resilient so that it can deform and yet always return to its original shape.

The material used to produce balance springs is usually steel. Being ductile, the steel used must resist corrosion. Developments over the past two decades have also proposed producing balance springs from silicon. Silicon balance springs allow a greater precision of the rate than their steel predecessors, in particular because they are insensitive to magnetism. However, they have a higher cost price and, because they are fragile, they are more difficult to assemble.

A balance spring must be isochronous. Regardless of how far the balance turns, it must always take the same amount of time to oscillate. If the balance spring contracts by just a few degrees, it accumulates little energy and returns slowly to its position of equilibrium. If the balance spring has moved far from its position of equilibrium, it very quickly moves in the opposite direction. The important thing is that these two journeys take the same amount of time to complete. The underlying idea is that the energy available to the balance spring is not constant and that it must still function, whether the watch is fully wound or in the final hours of its power reserve.

Due to the small dimensions thereof, balance springs are difficult to assemble. However, the way in which the two ends of a balance spring are attached also has a major influence on the precision of the rate of the horological movement. In most mechanical horological movements, the two ends of the balance spring are inserted into a drilled part and rendered immobile by means of a pin which is forcibly assembled manually using pliers. This can cause the balance spring to rotate slightly, which is detrimental to the precision of the rate of the movement.

Another technique consists of attaching the ends of the balance springs using an adhesive. However, this technique also has its limitations. It has been observed that, due to its viscosity, the adhesive exerts a tensile force on the balance spring by capillary action and can press the ends of the balance spring against the walls of the stud in which these ends are engaged. The resulting deformation of the balance spring induces mechanical stresses therein, which mechanical stresses are detrimental to keeping a consistent rate.

To overcome these problems, the Applicant has already proposed a method for attaching a balance spring consisting of adhesively bonding the outer last coil of a balance spring in a stud by means of a drop of fluid adhesive which can be polymerised, for example, by means of ultraviolet radiation. Thus, even if, when the drop of adhesive is deposited, for example by means of a syringe-type adhesive dispenser, the free end of the last coil of the balance spring moves slightly under the effect of the weight of the drop of adhesive, which induces undesired mechanical stresses in the balance spring, the adhesive is sufficiently fluid before hardening to allow the free end of the last coil of the balance spring to return spontaneously to its rest position. The mechanical stresses induced in the balance spring when the drop of liquid adhesive is deposited thus disappear on their own, and the consistency of the rate of the balance spring is not affected by the adhesive bonding operation carried out thereon.

The above solution thus allows a balance spring to be attached, by the free end of its outer last coil, within a stud while eliminating all, or at least most, of the mechanical stresses usually induced in such a balance spring during the assembly thereof. This greatly improves the consistency of the rate of the balance spring. During use, however, the Applicant has nonetheless realised that the hardened adhesive pad formed when the drop of liquid adhesive used to attach the free end of the outer last coil of the balance spring is polymerised sometimes tends to detach from the stud, which, of course, causes the horological movement in which this balance spring is installed to immediately fail. Such a situation is due in particular to problems with the surface condition of the stud, which prevent the adhesive pad from adhering perfectly to the stud, and due to the ageing of the adhesive pad over time. Moreover, when the ambient temperature rises, most adhesives soften, which consequently modifies the active length, and thus the stiffness, of the balance spring, and thus has a negative impact on the rate of the horological movement.

Finally, it should be noted that, in particular in the case of top-of-the-range horological movements, the use of adhesives or synthetic products is avoided wherever possible.

SUMMARY OF THE INVENTION

The purpose of the present invention is to overcome the aforementioned problems as well as others by providing an assembly for attaching a balance spring, an outer last coil whereof can be reliably immobilised without the use of an adhesive or of pins or even of manual operations such as clamping or crimping, etc., the success whereof depends in many cases on the dexterity of the operators.

To this end, the present invention relates to an assembly for attaching a free end of an outer last coil of a balance spring for a horological movement, this attachment assembly comprising a stud and a blocking element, the stud being provided with a groove in which the balance spring is engaged at a point along its length, the blocking element also being engaged in the groove, in contact with the balance spring, the attachment assembly further comprising a clamping member which presses the blocking element against the free end of the outer last coil of the balance spring, such that the free end of the outer last coil of the balance spring is immobilised in the groove of the stud.

According to one particular embodiment of the invention, the balance spring is engaged in the groove of the stud via the free end of its outer last coil.

According to another particular embodiment of the invention, the free end of the outer last coil of the balance spring is immobilised by mechanical clamping and blocking in a direction perpendicular to the plane in which this free end of the balance spring extends.

According to yet another particular embodiment of the invention, the groove extends from an outer wall of the stud towards the inside thereof.

According to yet another particular embodiment of the invention, the groove has a height and the blocking element a thickness such that, once the blocking element is engaged in this groove, enough space remains to be able to engage the free end of the outer last coil of the balance spring within the groove.

According to yet another particular embodiment of the invention, the space in which the free end of the outer last coil of the balance spring is engaged extends between the blocking element and a back of the groove.

According to yet another particular embodiment of the invention, the free end of the outer last coil of the balance spring terminates in a plate which is attached to this free end or which is made in one piece with this free end.

According to yet another particular embodiment of the invention, a hole in which the clamping member is engaged is formed in the stud such that the clamping member extends into the groove and presses against the blocking element, pressing the latter against the free end of the outer last coil of the balance spring.

According to yet another particular embodiment of the invention, the clamping member is a threaded rod and the hole is tapped.

According to yet another particular embodiment of the invention, the blocking element is a clamp provided with two jaws connected to one another at a distal end, these two jaws defining therebetween an open space on their proximal end side.

According to yet another particular embodiment of the invention, the stud comprises a wall which delimits the groove.

According to yet another particular embodiment of the invention, the inner face of one of the jaws of the clamp has a surface which extends away from the wall of the stud in the direction of engagement of the clamp on the stud.

According to yet another particular embodiment of the invention, the inner face of the jaws of the clamp is provided with a recess, the shapes whereof are complementary and match those of the wall, allowing the clamp to grip the wall and procure a sufficient hold while the operator engages the outer last coil of the balance spring within the groove made in the stud.

According to yet another particular embodiment of the invention, the attachment assembly of the balance spring can be disassembled.

Thanks to these features, the present invention provides an assembly for attaching the free end of the outer curve of a balance spring for a horological movement, with numerous advantages including, in particular, the fact that the balance springs can be attached without adhesive, regardless of the type of material used to produce such balance springs. It thus follows that the watchmaker has complete freedom in choosing the material from which the balance spring is made and that, moreover, since the free end of the balance spring is not bonded, the attachment assembly according to the invention can be disassembled. Furthermore, as the free end of the outer last coil of the balance spring is immobilised by the blocking element which is pressed against the free end of the outer last coil of the balance spring by the clamping member, no mechanical torque is transmitted to the balance spring, and thus the latter can be attached in its rest position in the X-Y plane parallel to the plane in which the horological movement extends with no or virtually no influence on its ability to keep a consistent rate. More specifically, it is known that the stress exerted on the free end of the outer last coil of the balance spring perpendicular to the plane in which this free end extends is virtually non-existent. Another great advantage of the attachment assembly according to the invention lies in the fact that mounting the free end of the outer last coil of the balance spring does not depend in any way on the dexterity of the operator responsible for this mounting operation, and thus the reproducibility of the operation of the sprung balance assemblies equipped with an attachment assembly according to the invention is quite remarkable.

BRIEF DESCRIPTION OF THE FIGURES

Other features and advantages of the present invention will be better understood upon reading the following detailed description of one embodiment of an attachment assembly according to the invention, said example being provided for the purposes of illustration only and not intended to limit the scope of the invention, given with reference to the accompanying drawing, in which.

DETAILED DESCRIPTION OF THE INVENTION

The present invention was drawn from the general inventive idea consisting of attaching the free end of the outer last coil of a horological balance spring in a stud by means of an attachment assembly immobilising this free end by a combined mechanical pressing and blocking action. In this way, the free end of the balance spring does not need to be bonded in order to produce the attachment, giving total freedom in the choice of materials used to produce the balance spring. Moreover, as there is no bonding, the attachment assembly according to the invention can be disassembled at any time. Another major advantage of the attachment assembly according to the invention lies in the fact that the free end of the outer last coil of the balance spring is immobilised by mechanical clamping and blocking in a direction perpendicular to the plane in which this free end of the balance spring extends. As a result, the attachment of this free end of the balance spring does not induce any mechanical tensile or torsional torque in the free end of the outer last coil of the balance spring, such that the consistency of the rate of the balance spring is in no way affected by attaching the free end of its outer last coil in the stud. This is even truer as the mechanical stresses exerted on the outer last coil of the balance spring in the direction perpendicular to the plane in which this outer last coil extends are zero or entirely negligible.

Figure 1:
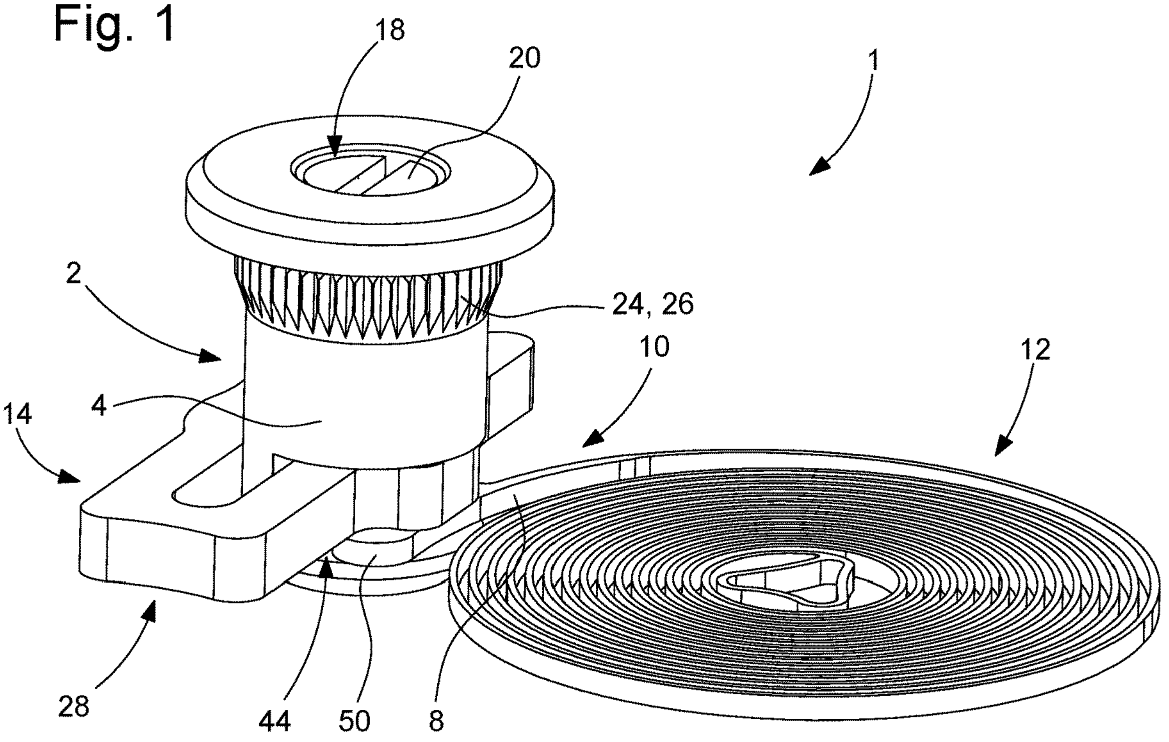
FIG. 1 is a perspective top view of the assembly according to the invention, in which is attached a free end of an outer last coil of a balance spring for a horological movement.
Figure 2:
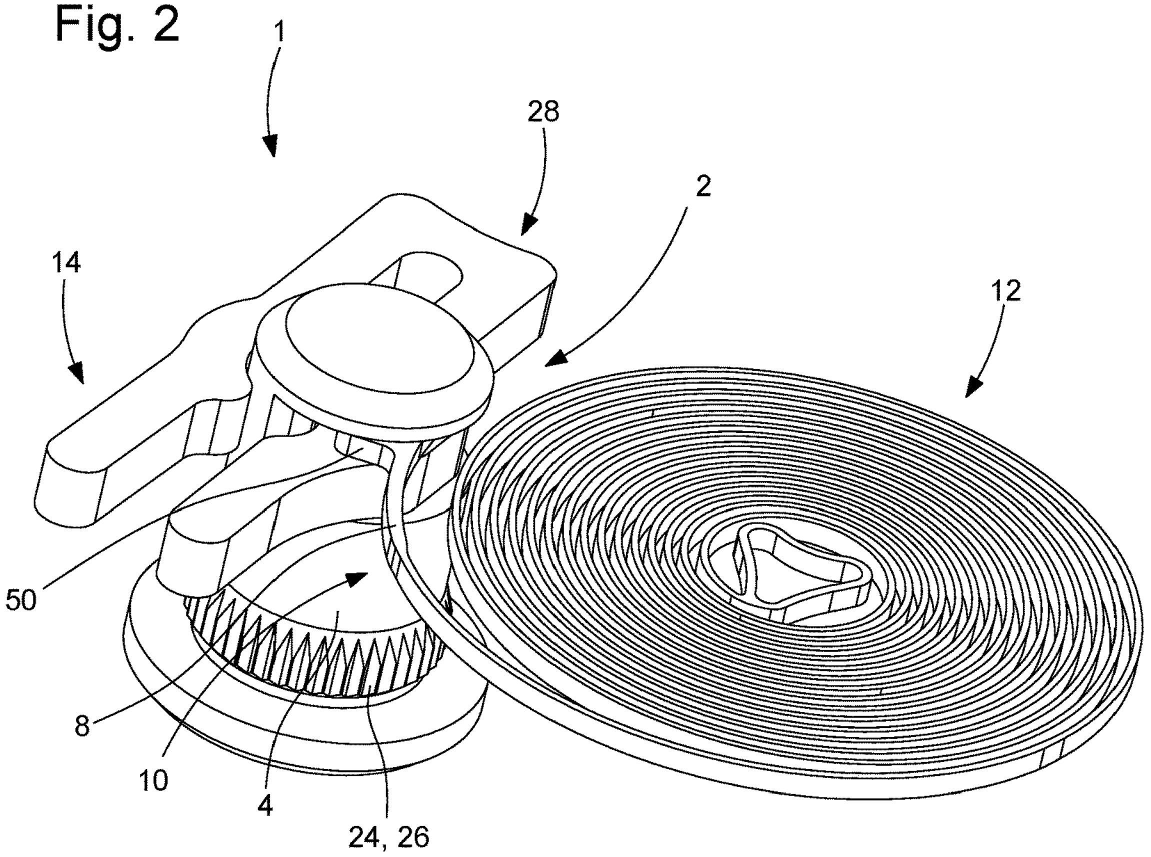
FIG. 2 is a perspective bottom view of the attachment assembly according to the invention shown in FIG. 1.

Denoted as a whole by the general reference numeral 1, the attachment assembly according to the invention is shown as a whole in FIGS. 1 and 2 and comprises in particular a stud 2. By way of illustration only, the stud 2 shown in the drawing is delimited externally by a casing that is overall cylindrical in shape. It is understood that the shape of the stud 2 is not a decisive factor for the purposes of the invention, as such a stud 2 can have a shape that differs from a cylindrical shape and can be parallelepipedal for example.

Figure 3:
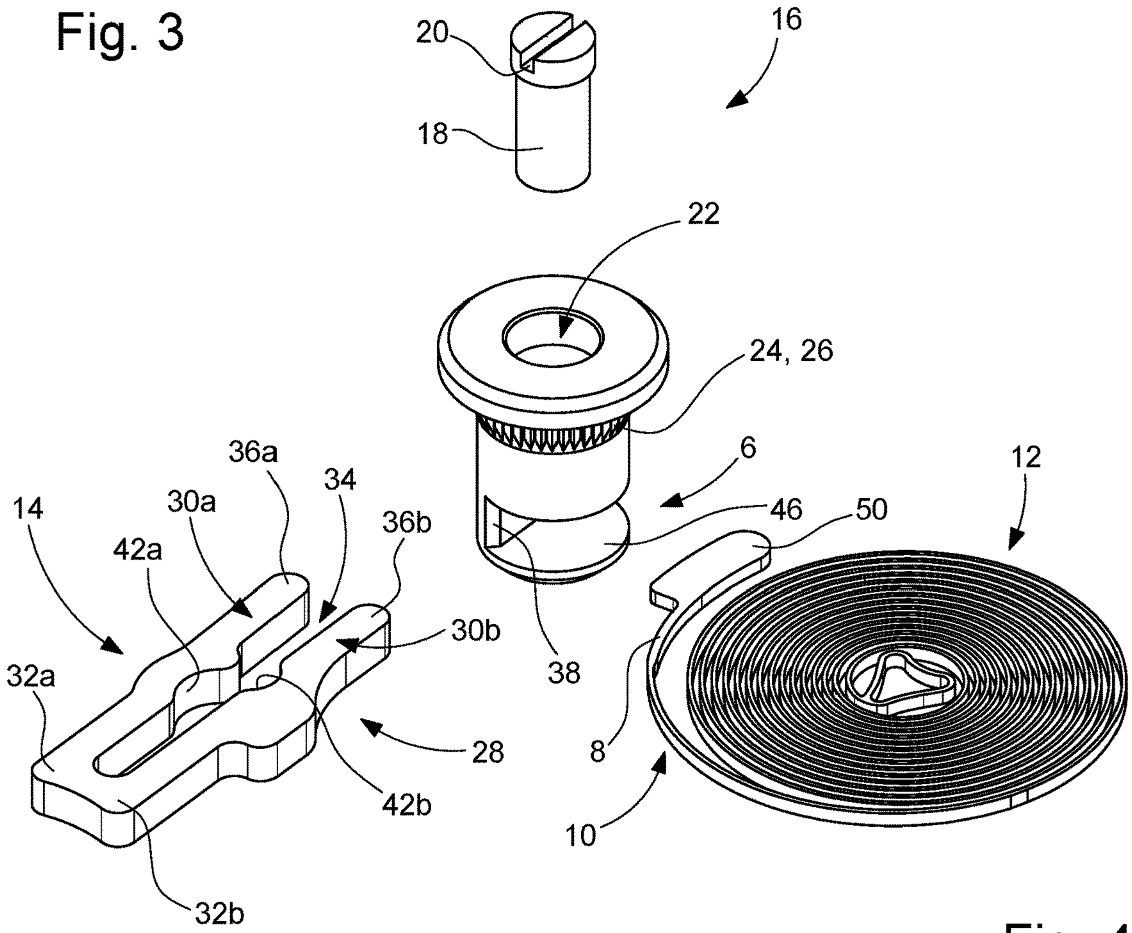
FIG. 3 is a perspective top view of the attachment assembly according to the invention in the separated state.
Figure 4:
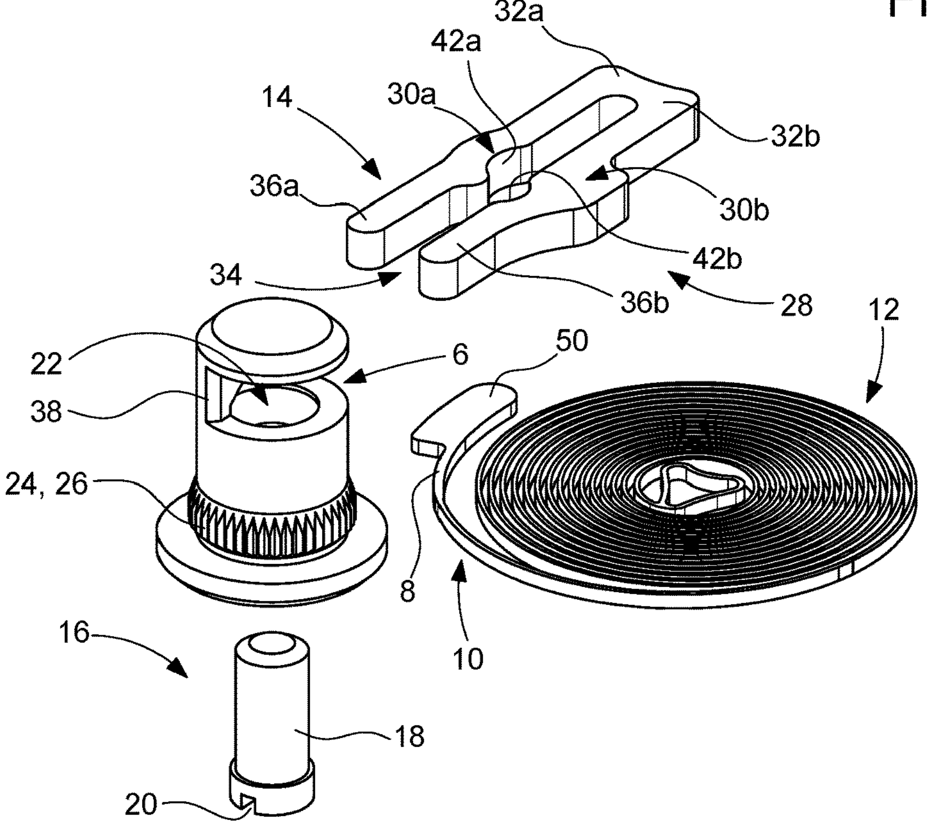
FIG. 4 is a perspective bottom view of the attachment assembly according to the invention in the separated state.
Figure 5:
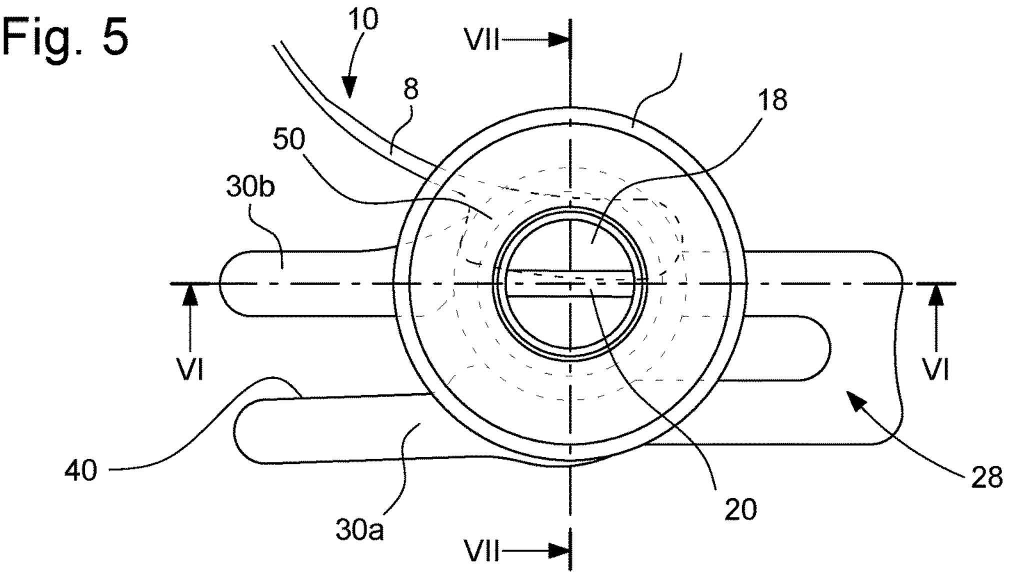
FIG. 5 is a top view of the attachment assembly according to the invention, in which is engaged the free end of the outer last coil of a balance spring for a horological movement.
Figure 6:
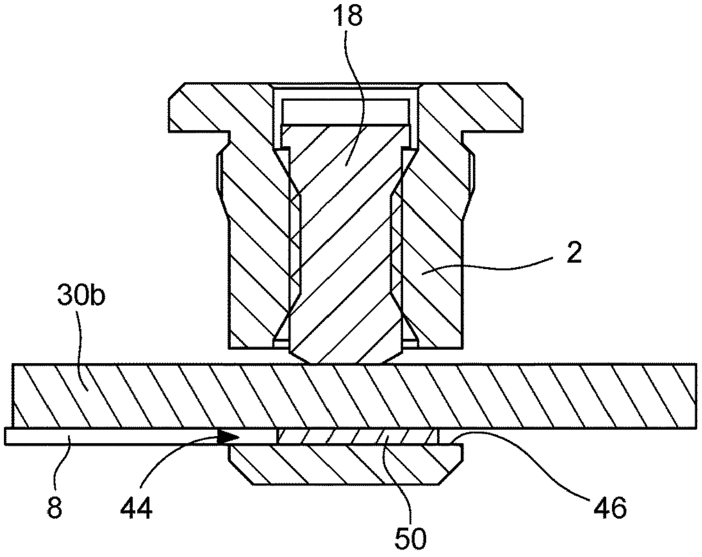
FIG. 6 is a sectional view of the attachment assembly according to the invention taken along the line VI-VI shown in FIG. 5.
Figure 7:
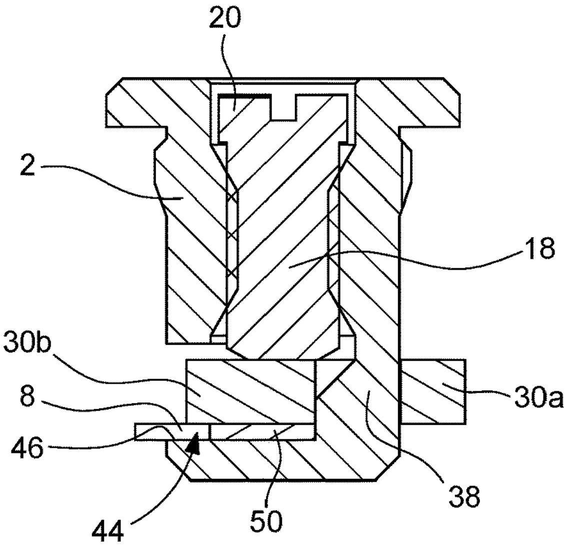
FIG. 7 is a sectional view of the attachment assembly according to the invention taken along the line VII-VII shown in FIG. 5.

Preferably, but by no means exclusively, a groove 6, preferably having a square or rectangular cross-section, as shown in particular in FIGS. 3 and 4, is formed, leading from an outer wall 4 of the stud 2 towards the inside thereof. This groove 6 is intended to receive a free end 8 of an outer last coil 10 of a balance spring 12 for a horological movement in order to block the latter as described in detail hereinbelow.

The attachment assembly 1 according to the invention further comprises a blocking element 14 which is also intended to be engaged in the groove 6, in contact with the free end 8 of the outer last coil 10 of the balance spring 12, and then to be pressed against this free end 8 to immobilise the balance spring 12 within this groove 6.

To this end, the attachment assembly 1 is further supplemented by a clamping member 16 which is arranged so as to adjustably press the blocking element 14 against the free end 8 of the outer last coil 10 of the balance spring 12.

According to the embodiment of the invention illustrated in the drawing (see FIG. 3 for example), the clamping member 16 can be of the type of a threaded rod 18 provided with a slotted head 20. This threaded rod 18 is intended to be screwed into a tapped hole 22 made in the stud 2 such that this threaded rod 18 extends into the groove 6 and presses against the blocking element 14, pressing the latter against the free end 8 of the outer last coil 10 of the balance spring 12.

It is easily understood that, depending on the degree to which the threaded rod 18 is screwed in, the clamping force which, via the blocking element 14, is exerted on the free end 8 of the outer last coil 10 of the balance spring 12 and which ensures that this free end 8 is immobilised in the groove 6 of the stud 2, can be precisely adjusted.

A rubbing surface 24, for example a knurling 26, can be provided on the stud 2. In particular, this rubbing surface 24 can be used by the operator to get a better grip on this stud 2 when screwing the threaded rod 18 into the tapped hole 22 in the stud 2.

As described hereinabove, the clamping member 16 is a threaded rod 18. It goes without saying that this is only an example, and the clamping member 16 can take other forms such as, for example, a simple pin engaged with sufficiently greasy friction in the hole made in the stud 2 so as to be able to press against the blocking element 14, firmly pressing the latter against the free end 8 of the outer last coil 10 of the balance spring 12, while being able to be disengaged from this hole where necessary, for example if the balance spring 12 breaks.

In its preferred but non-limiting embodiment, the blocking element 14 is of the type formed by a clamp 28 with a certain elasticity and provided with two overall rectilinear jaws 30*a* and 30*b* which extend substantially parallel to, and at a distance from, one another. Connected to one another at their distal end 32*a*, 32*b*, these two jaws 30*a*, 30*b* define therebetween a space 34 that is open on their proximal end 36*a*, 36*b* side.

With its space 34 open on the proximal end 36*a*, 36*b* side of its jaws 30*a*, 30*b*, the clamp 28 is engaged on either side of a wall 38 of the stud 2 resulting from the machining of the groove 6. The mere overlap of the clamp 28 on the wall 38 of the stud 2 is enough to sufficiently hold this clamp 28 in place long enough for the operator to tighten the threaded rod 18. However, this hold can be slightly increased by providing the inner face of one of the jaws 30*a*, 30*b* of the clamp 28 with a surface 40 which extends away from the wall 38 of the stud 2 in the direction of engagement of the clamp 28. The hold of the clamp 28 on the wall 38 of the stud 2 can be further improved by providing recesses 42*a*, 42*b* on the inner face of its jaws 30*a*, 30*b*, the shapes of which recesses 42*a*, 42*b* are complementary and match those of this wall 38, thus allowing the clamp 28 to grip the wall 38 of the stud 2 and ensure that it is held by friction.

It is important to understand that the height of the groove 6 is greater than the thickness of the jaws 30*a*, 30*b* of the clamp 28, so that, once the clamp 28 is engaged in this groove 6, there is still enough space to be able to easily engage the free end 8 of the outer last coil 10 of the balance spring 12 in the groove 6.

Figure 8:
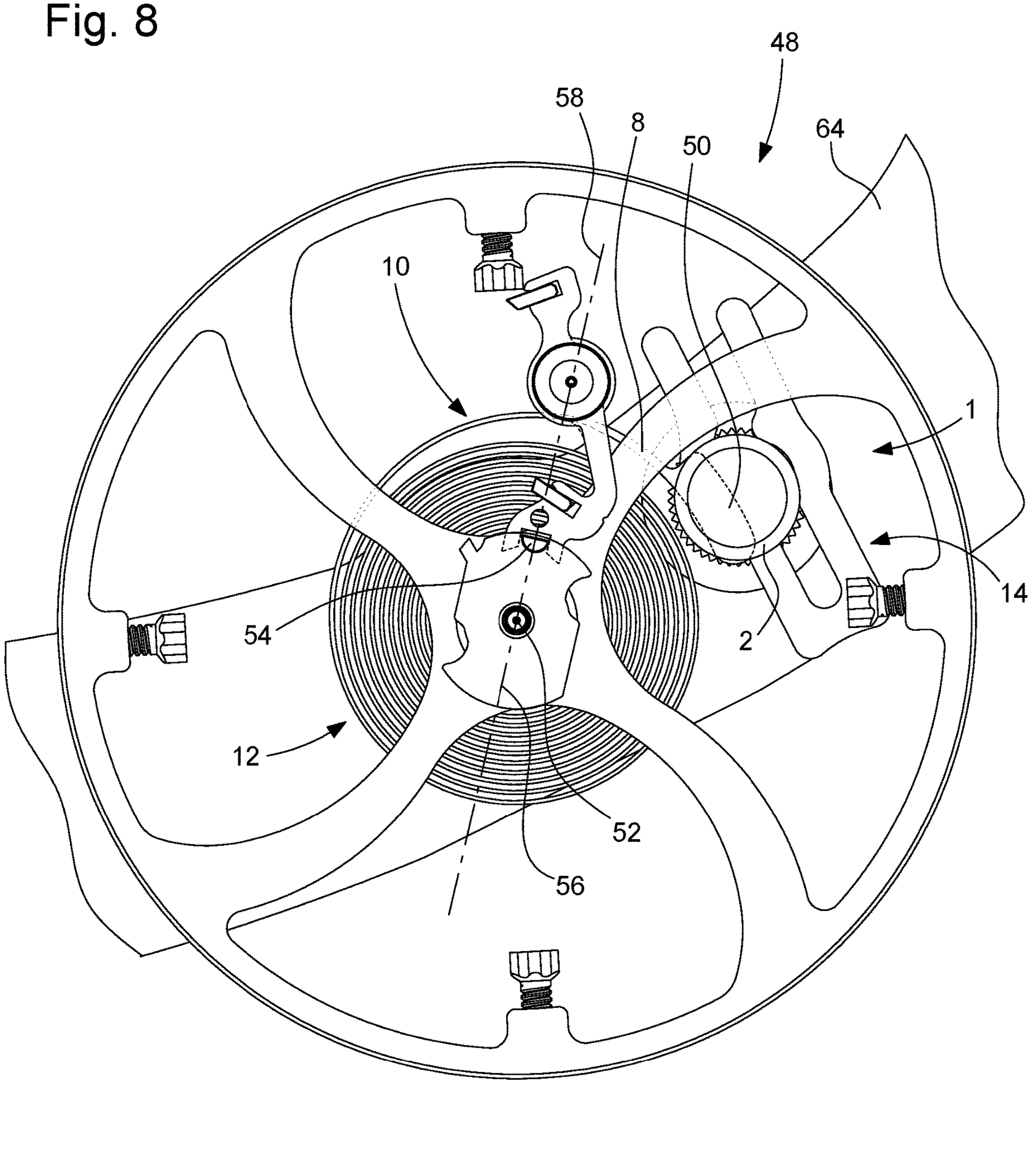
FIG. 8 is a top view of the attachment assembly according to the invention mounted in a sprung balance assembly for a horological movement.
Figure 9:
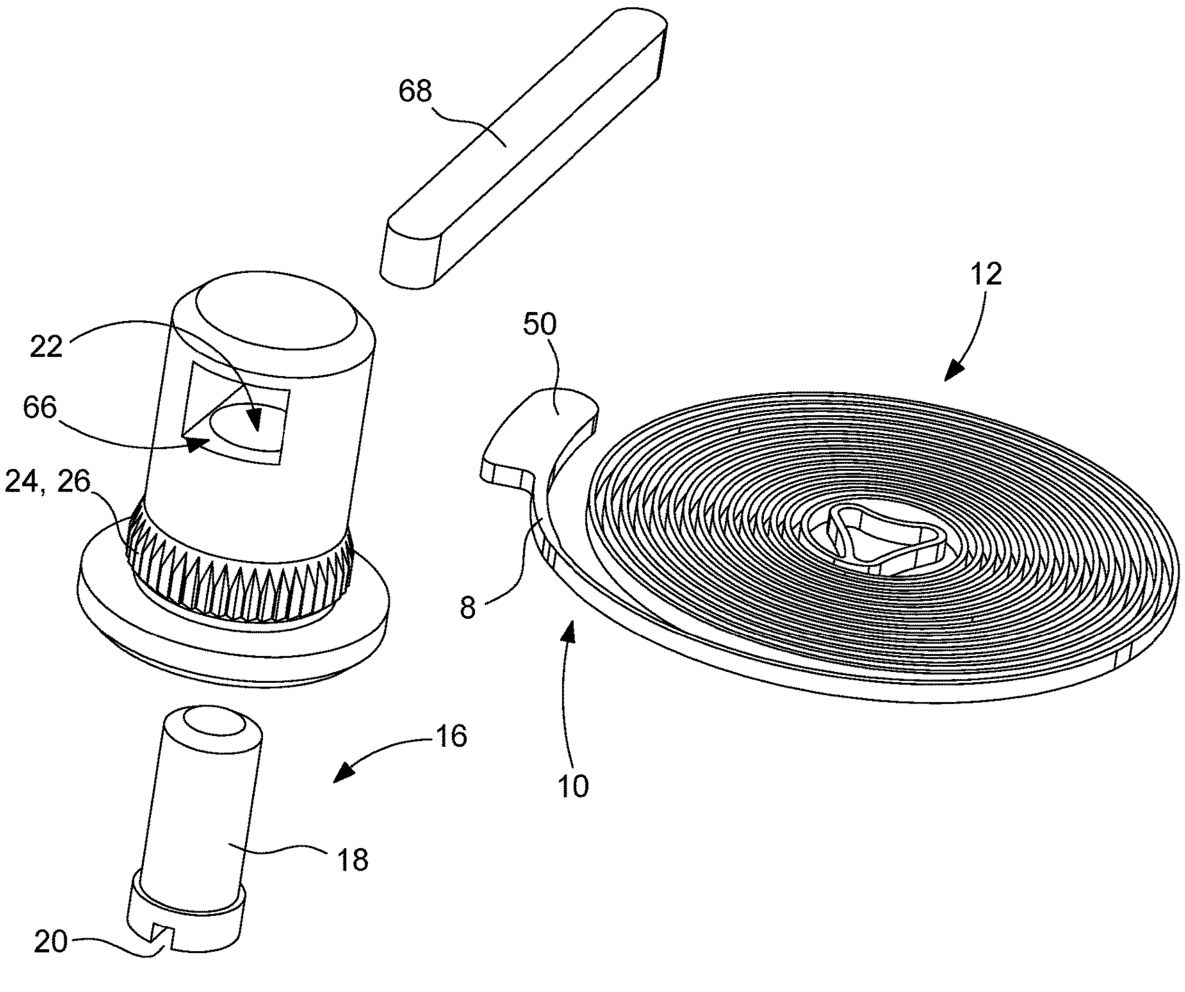
FIG. 9 is a diagrammatic view of a simplified embodiment of the attachment assembly according to the invention.
Figure 10:
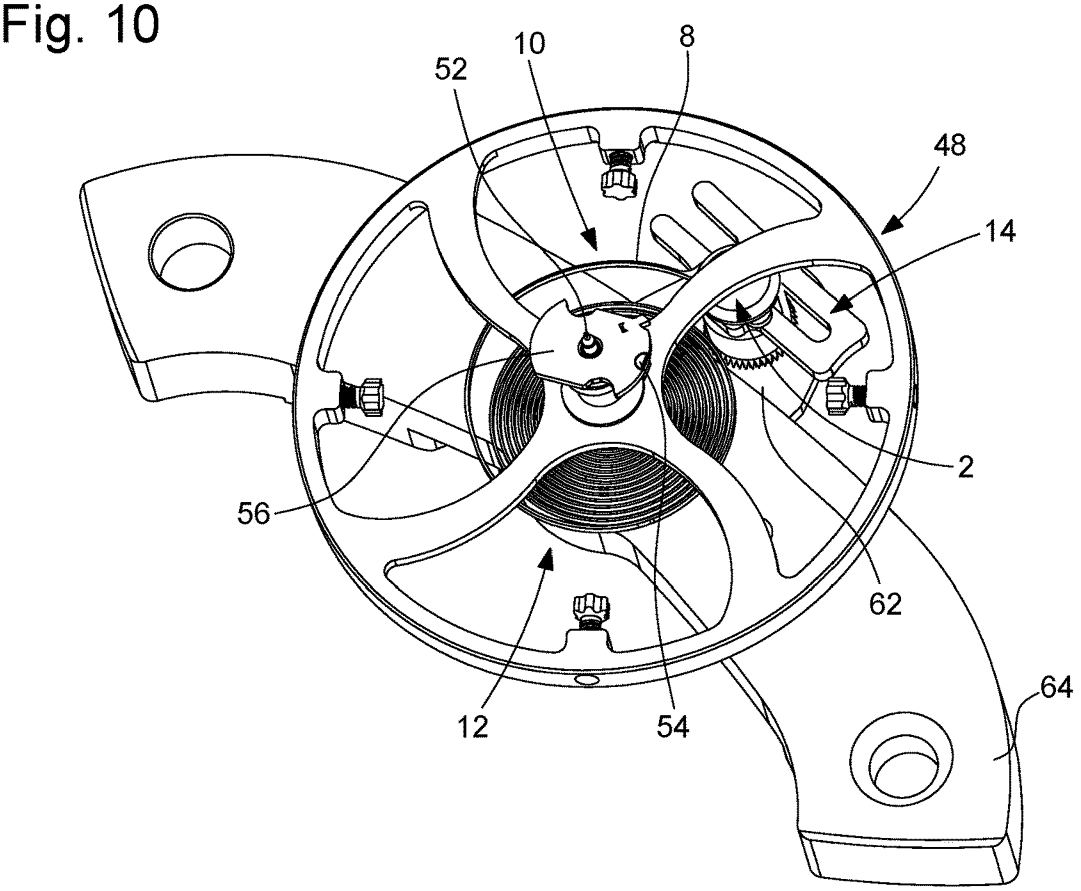
FIGS. 10 and 11 are perspective top and bottom views respectively of the sprung balance assembly provided with the attachment assembly according to the invention shown from a top view in FIG. 8.
Figure 11:
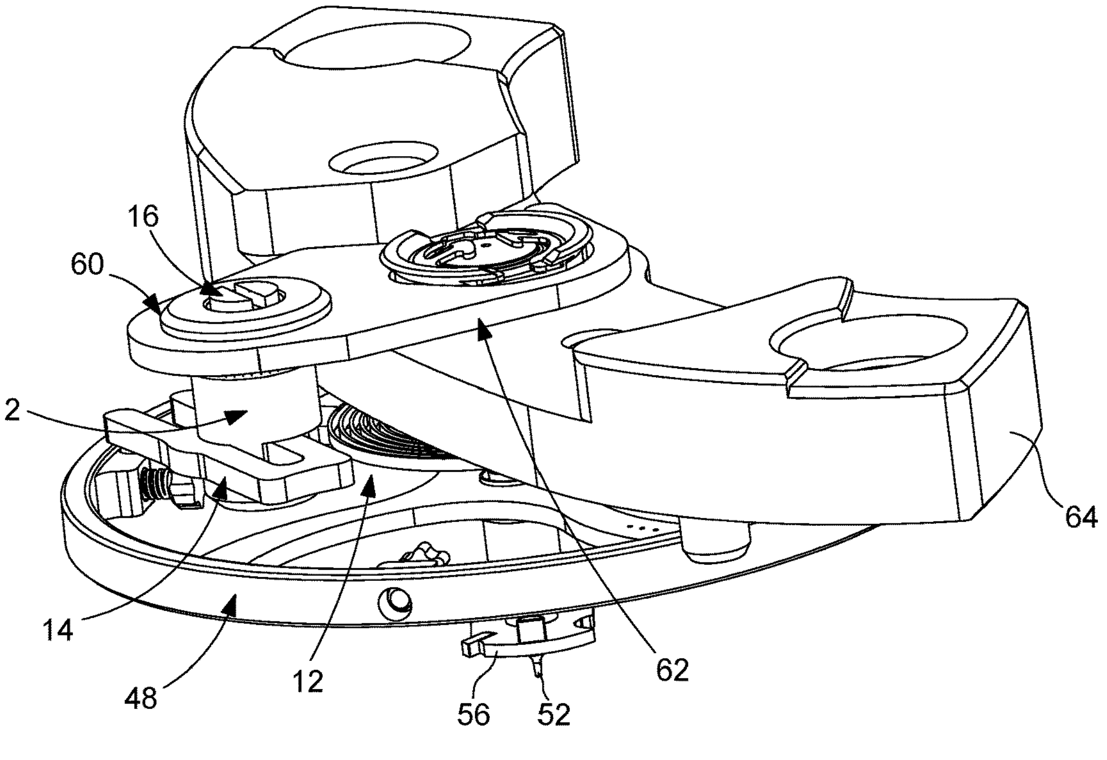

The operation of attaching the free end 8 of the outer last coil 10 of the balance spring 12 is carried out as follows: the clamp 28 is firstly engaged via its space 34 open on the proximal end 36*a*, 36*b* side of its jaws 30*a*, 30*b* in the groove 6 of the stud 2, on either side of the wall 38 of this stud 2. The overlapping of the clamp 28 on the wall 38 of the stud 2 is sufficient to ensure that the clamp 28 is held on this wall 38 long enough to attach the free end 8 of the outer last coil 10 of the balance spring 12 to the stud 2. When the clamp 28 is being mounted, care is taken to ensure that this clamp 28 is positioned so that enough space 44 remains between the jaws 30*a*, 30*b* of this clamp 28 and a back 46 of the groove 6 to be able to easily engage the free end 8 of the outer last coil 10 of the balance spring 12. Once the clamp 28 has been suitably positioned and attached in the groove 6 of the stud 2, the free end 8 of the outer last coil 10 of the balance spring 12 is easily engaged in the groove 6, between the back 46 thereof and the jaws 30*a*, 30*b* of the clamp 28. The free end 8 of the outer last coil 10 of the balance spring 12 often terminates in a plate 50. Depending on the case, this plate 50 is attached to the free end 8 of the outer last coil 10 of the balance spring 12, for example by welding, or is made in one piece with this free end 8. The guide-mark is adjusted by pivoting the attachment assembly 1, in other words by pivoting the point of attachment of the outer last coil 10 of the balance spring 12 about an axis 52 of a balance 48, to align an impulse pin 54 of a roller 56 with an escapement line 58 (see FIG. 8). To this end (see FIGS. 10 and 11), the stud 2 is engaged in an opening 60 made in a stud-holder part 62 which is carried by a bridge 64, commonly referred to as a cock, and which is mounted such that it pivots about the staff 52 of the balance 48. Similarly, rather than being made in the stud 2 from the outside thereof, the groove 6 can very well be made as a through-hole 66 in the thickness of the stud 2 (see FIG. 9). A blocking element 14, for example of the type formed by a rod 68, is engaged in this through-hole 66. Finally, the operator tightens the threaded rod 18 so that it presses against the jaws 30*a*, 30*b* of the clamp 28, pressing the latter against the free end 8 of the outer last coil 10 of the balance spring 12. The operations for mounting the free end

8 of the outer last coil 10 of the balance spring 12 are thus complete and the balance spring 12 is now removably attached to the stud 2.

It goes without saying that the present invention is not limited to the embodiment described hereinabove and that various simple alternatives and modifications can be considered by a person skilled in the art without leaving the scope of the invention as defined by the accompanying claims. In particular, it is understood that the groove 6 can have a cross-section that is not square or rectangular. It should also be noted that the rubbing surface 24 such as the knurling 26 provided on the stud 2 is particularly useful after the stud 2 has been driven into the stud-holder part 62. More specifically, the threaded rod 18 can be screwed into the locking position relatively easily. Only the friction induced by the threads of the threaded rod 18 in the tapped hole of the stud 2 is capable of causing the stud 2 to rotate during this operation. At this stage of the operation, however, this friction is negligible in light of the torque required to turn the stud 2. However, when the threaded rod 18 reaches the blocking position inside the tapped hole 22, a large part of the tightening torque transmitted to the threaded rod 18 by the operator is transmitted to the stud 2, which can cause the stud 2 to pivot relative to the stud-holder part 62. It goes without saying that such pivoting must be avoided, which is why the stud 2 has been provided, for example, with a knurling 26 which, by contact with the stud-holder part 62, has the effect of increasing the resistance of the stud 2 to this torque. It must also be understood that, depending on the geometric shape of the balance spring 12, which can be particular, this balance spring 12 can be engaged in the groove 6 of the stud 2 at a point along its length that is different from that of the free end 8 of its outer last coil 10. It must also be understood that the free end 8 of the outer last coil 10 of the balance spring 12 is immobilised by mechanical clamping and blocking in a direction perpendicular to the plane in which this free end 8 of the balance spring 12 extends. In the case where the balance spring 12 terminates in a plate 50, if this plate 50 extends parallel to the plane in which the balance spring 12 lies, the clamping-blocking of this plate 50 will take place perpendicularly to the plane of the balance spring 12. Conversely, if the plate 50 extends perpendicular to the plane in which the balance spring 12 lies, the clamping-blocking of this plate 50 will take place in a direction parallel to the plane of the balance spring 12. In other words, the threaded rod 18 will be screwed into the stud 2 in a direction perpendicular to the longitudinal axis of symmetry of the stud 2. It should also be noted that since the balance spring 12 takes the form of an extremely thin ribbon wound about itself in a succession of coils, the plane in which the free end 8 of the outer last coil 10 of the balance spring 12 extends is understood to mean the plane in which this winding lies. It should also be noted that the plate 50 is a surface element, of rectangular shape for example, and that, depending on the case, this surface element either lies in the plane of the balance spring 12, or perpendicular to this plane.

NOMENCLATURE

1. Attachment assembly
2. Stud
4. Outer wall
6. Groove
8. Free end
10. Outer last coil
12. Balance spring

14. Blocking element
16. Clamping member
18. Threaded rod
20. Slotted head
22. Tapped hole
24. Rubbing surface
26. Knurling
28. Clamp
30*a*, 30*b*. Jaws
32*a*, 32*b*. Distal ends
34. Space
36*a*, 36*b*. Proximal ends
38. Wall
40. Surface
42*a*, 42*b*. Recesses
44. Space
46. Bottom
48. Balance
50. Plate
52. Staff
54. Impulse pin
56. Roller
58. Escapement line
60. Oblong opening
62. Stud-holder part
64. Bar
66. Through-hole
68. Rod

The invention claimed is:

1. An assembly (1) for attaching a free end (8) of an outer last coil (10) of a balance spring (12) for a horological movement, the attachment assembly (1) comprising a stud (2) and a blocking element (14), the stud (2) being provided with a groove (6) in which the balance spring (12) is engaged at a point along its length, and a bottom (46) that is separated by the groove (6) in a first direction (Z) that is perpendicular to a plane in which a winding of the coils lies, the blocking element (14) being elastically engaged with the stud (2) in the groove (6), and being in contact with the balance spring (12), the attachment assembly (1) further comprising a clamping member (16) which presses the blocking element (14) in the first direction (Z) against the balance spring (12) and the bottom (46), such that the balance spring (12) is immobilised in the groove (6) of the stud (2) in the first direction (Z).

2. The attachment assembly (1) according to claim 1, wherein the balance spring (12) is engaged within the groove (6) of the stud (2) via the free end (8) of its outer last coil (10).

3. The attachment assembly according to claim 2, wherein the free end (8) of the outer last coil (10) of the balance spring (12) is immobilised by mechanical clamping and blocking in a direction perpendicular to the plane in which this free end (8) of the balance spring (12) extends.

4. The attachment assembly (1) according to claim 1, wherein the groove (6) extends from an outer wall (4) of the stud (2) towards the inside thereof.

5. The attachment assembly (1) according to claim 4, wherein the groove (6) has a height and the blocking element (14) a thickness such that, once the blocking element (14) is engaged in this groove (6), enough space remains to be able to engage the free end (8) of the outer last coil (10) of the balance spring (12) within the groove (6).

6. The attachment assembly (1) according to claim 5, wherein the space in which the free end (8) of the outer last coil (10) of the balance spring (12) is engaged extends between the blocking element (14) and the bottom (46) of the groove (6).

7. The attachment assembly (1) according to claim 6, wherein the free end (8) of the outer last coil (10) of the balance spring (12) terminates in a plate (50) which is attached to this free end (8) or which is made in one piece with this free end (8).

8. The attachment assembly (1) according to claim 1, wherein a hole (22) in which the clamping member (16) is engaged is formed in the stud (2) such that the clamping member (16) extends into the groove (6) and presses against the blocking element (14), pressing the latter against the free end (8) of the outer last coil (10) of the balance spring (12).

9. The attachment assembly (1) according to claim 8, wherein the clamping member (16) is a threaded rod (18) and wherein the hole (22) is tapped.

10. The attachment assembly (1) according to claim 8, wherein the blocking element (14) is a clamp (28) provided with two jaws (30*a*, 30*b*) connected to one another at a distal end (32*a*, 32*b*), these two jaws (30*a*, 30*b*) defining therebetween a space (34) that is open on their proximal end (36*a*, 36*b*) side.

11. The attachment assembly (1) according to claim 10, wherein the stud (2) comprises a wall (38) which delimits the groove (6).

12. The attachment assembly (1) according to claim 11, wherein the inner face of one of the jaws (30*a*, 30*b*) of the clamp (28) has a surface (40) which extends away from the wall (38) of the stud (2) in the direction of engagement of the clamp (28) on the stud (2).

13. The attachment assembly (1) according to claim 11, wherein the inner faces of the jaws (30*a*, 30*b*) of the clamp (28) are provided with recesses (42*a*, 42*b*), the shapes of the recesses are complementary and match a shape of the wall (38), allowing the clamp (28) to grip the wall (38) and hold it.

14. The attachment assembly (1) according to claim 1, wherein the balance spring (12) is configured to be immobilised in the groove (6) of the stud (2) in the first direction (Z) without any adhesive.

15. The attachment assembly (1) according to claim 1, wherein the blocking element (14) is a clamp (28) provided with two jaws (30*a*, 30*b*) and formed with elasticity, these two jaws (30*a*, 30*b*) defining therebetween a space (34) that is open on their proximal end (36*a*, 36*b*) side, and wherein the two jaws (30*a*, 30*b*) elastically are engaged with the stud (2) in the groove (6).

16. The attachment assembly (1) according to claim 15, wherein the stud (2) comprises a wall (38) which delimits the groove (6) along the first direction (Z) between the stud (2) and the bottom (46), and wherein the two jaws (30*a*, 30*b*) are engaged with the wall (38) of the stud (2).

* * * * *